US012625112B2

(12) United States Patent
Hemond et al.

(10) Patent No.: US 12,625,112 B2
(45) Date of Patent: May 12, 2026

(54) HOUSING OF AN ULTRASONIC SENSOR

(71) Applicant: TE Connectivity Solutions GmbH, Schaffhausen (CH)

(72) Inventors: Jessica H. B. Hemond, Middletown, PA (US); Michael Pedrick, Hampton, VA (US); Rakshith Badarinath, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 490 days.

(21) Appl. No.: 18/353,959

(22) Filed: Jul. 18, 2023

(65) Prior Publication Data

US 2025/0027909 A1 Jan. 23, 2025

(51) Int. Cl.
| | |
|---|---|
| *G01N 29/22* | (2006.01) |
| *G01N 29/02* | (2006.01) |
| *G01N 29/24* | (2006.01) |

(52) U.S. Cl.
CPC ........... *G01N 29/222* (2013.01); *G01N 29/02* (2013.01); *G01N 29/24* (2013.01)

(58) Field of Classification Search
None
See application file for complete search history.

(56) References Cited

U.S. PATENT DOCUMENTS

| | | | |
|---|---|---|---|
| 8,742,646 B2 * | 6/2014 | Wodnicki | .............. B06B 1/0622 |
| | | | 310/334 |
| 2011/0148547 A1 * | 6/2011 | Zhang | ................ H03H 9/02118 |
| | | | 333/187 |
| 2017/0288638 A1 | 10/2017 | Wildes et al. | |

OTHER PUBLICATIONS

Antonio J. Balvantin, Erik Rojas-Mancera, Victor A. Ramirez, et al., The Suitability of Using 3D PLA Printed Wedges for Ultrasonic Wave Propagation, IEEE Access, (2020) 5 pages (p. 15205-15209), vol. 8.

* cited by examiner

*Primary Examiner* — Suman K Nath

(57) ABSTRACT

A housing of an ultrasonic sensor includes a plurality of layers of a housing material integrally connected together to form the housing. A first section of the housing has a first plurality of layers of the housing material each with a first thickness. A second section of the housing has a second plurality of layers of the housing material each with a second thickness. The second thickness is greater than the first thickness and an ultrasonic wave transmitted through the housing has a greater transmission efficiency in the first section than in the second section.

20 Claims, 4 Drawing Sheets

HOUSING OF AN ULTRASONIC SENSOR

FIELD OF THE INVENTION

The present invention relates to an ultrasonic sensor and, more particularly, to a housing of an ultrasonic sensor.

BACKGROUND

An ultrasonic sensor includes a housing having an emitter and a receiver disposed in the housing. The emitter is controlled to emit an ultrasonic wave through the housing that is received by the receiver and output as a voltage signal. When external elements, such as a tube having a fluid, are positioned against the housing between the emitter and the receiver, the ultrasonic sensor can be used to detect qualities of the external element by analyzing the voltage signal that depends on the ultrasonic wave received by the receiver.

The ultrasonic wave propagates through the housing, and material properties of the housing dictate the efficiency of the ultrasonic wave received at the receiver. Housings of ultrasonic sensors are commonly injection molded in a single piece. Although the injection molding process produces housings that are generally efficiency for propagating ultrasonic waves, injection molding is not an efficient process and is not sufficiently flexible to produce variations or customized housings in small batches. Further, housings in ultrasonic sensors often also generate unwanted ultrasonic wave propagation, which requires additional mitigations such as additional dampening materials to reduce ringing and maintain the accuracy of the sensor.

SUMMARY

A housing of an ultrasonic sensor includes a plurality of layers of a housing material integrally connected together to form the housing. A first section of the housing has a first plurality of layers of the housing material each with a first thickness. A second section of the housing has a second plurality of layers of the housing material each with a second thickness. The second thickness is greater than the first thickness and an ultrasonic wave transmitted through the housing has a greater transmission efficiency in the first section than in the second section.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
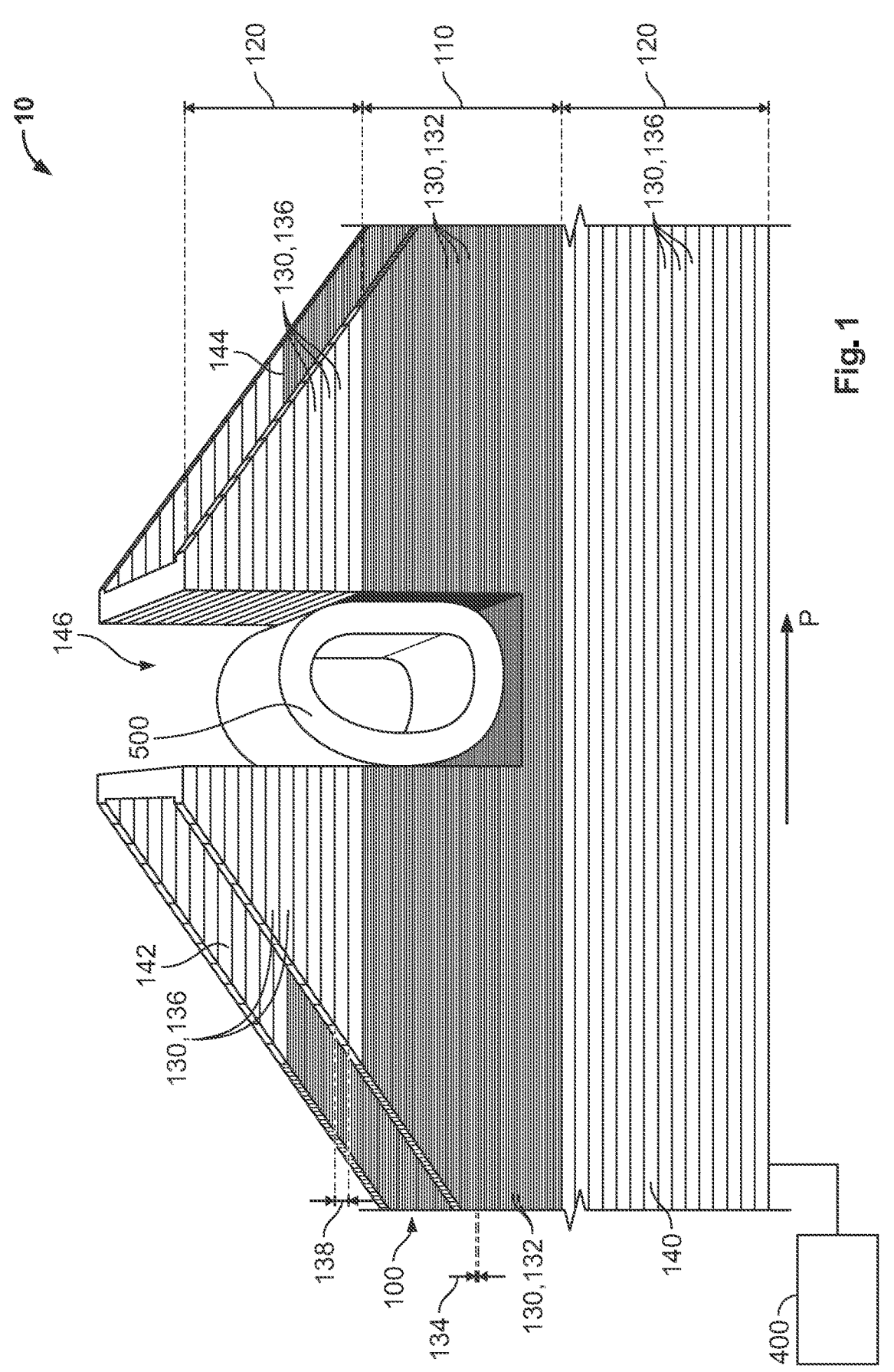
FIG. 1 is a perspective view of a ultrasonic sensor according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details. Throughout the drawings, only one of a plurality of identical elements may be labeled in a figure for clarity of the drawings, but the detailed description of the element herein applies equally to each of the identically appearing elements in the figure.

Figure 2A:
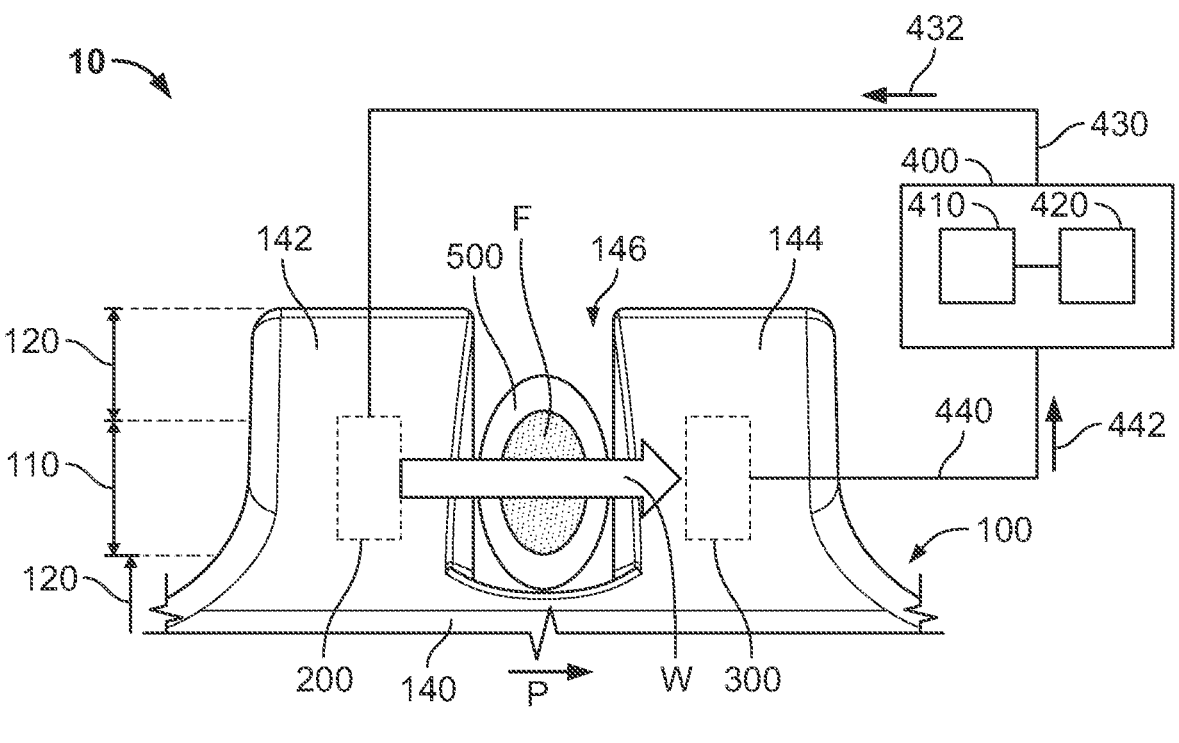
FIG. 2A is a schematic diagram of the ultrasonic sensor with a fluid conduit transmitting a fluid.
Figure 2B:
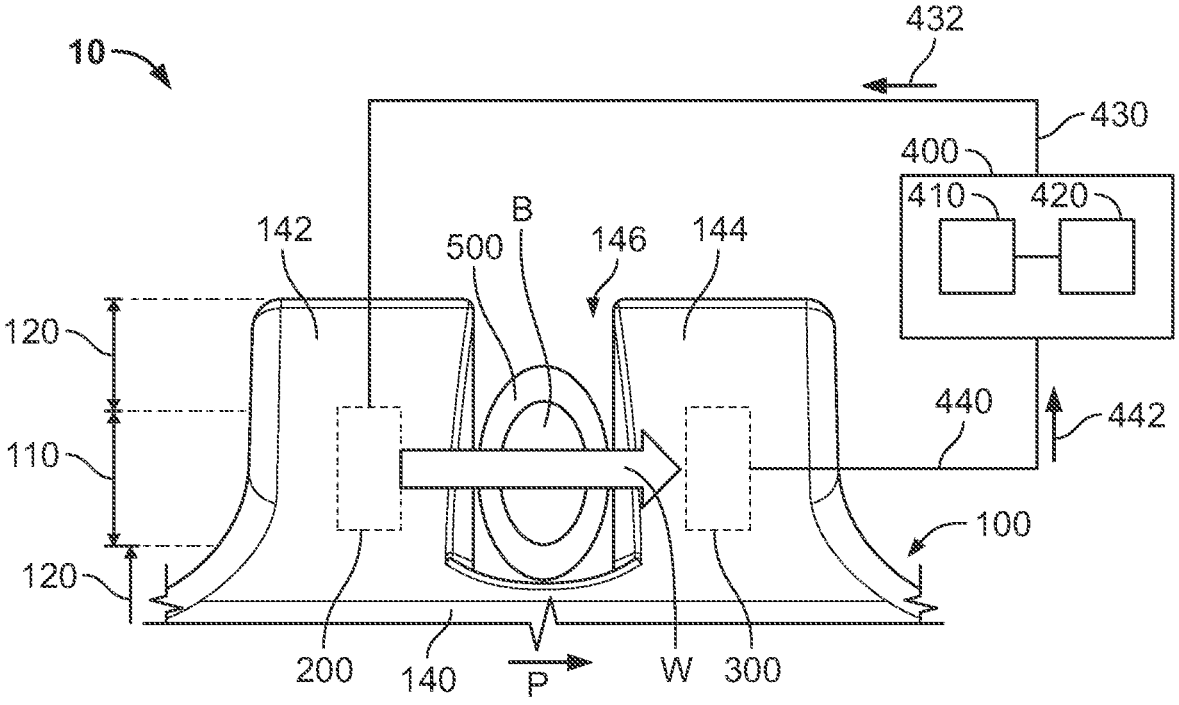
FIG. 2B is a schematic diagram of the ultrasonic sensor with the fluid conduit having a bubble in the fluid.

An ultrasonic sensor 10 according to an embodiment, as shown in FIGS. 1, 2A, and 2B, includes a housing 100, an emitter 200 and a receiver 300 disposed in the housing 100, and a controller 400 connected to the emitter 200 and the receiver 300.

The housing 100 has a base 140, a first receiving portion 142 extending from the base 140, and a second receiving portion 144 extending from the base 140. The housing 100 has a channel 146 defined between the first receiving portion 142 and the second receiving portion 144. The channel 146 is positioned between the first receiving portion 142 and the second receiving portion 144 along a propagation direction P described in greater detail below.

In the embodiment shown in FIG. 1, the first receiving portion 142 and the second receiving portion 144 each have an approximately triangular shape with a flat side facing the channel 146. In the embodiment of the housing 100 shown in FIGS. 2A, 2B, and 3, the first receiving portion 142 and the second receiving portion 144 each have an approximately rectangular shape with a flat side facing the channel 146. In other embodiments, the first receiving portion 142 and the second receiving portion 144 could be any other shape that extends from the base 140 to define the channel 146 and can be formed with the housing 100 according to the embodiments described herein.

The housing 100, including the base 140 and the receiving portions 142, 144, is monolithically formed in a single piece from a plurality of layers 130 of a housing material that are integrally connected together to form the housing 100, as shown in FIG. 1. In the shown embodiment, each of the interfaces between the plurality of layers 130 that form the housing 100 extends approximately parallel to the propagation direction P. Throughout the present specification, the term "approximately" is intended to mean that the disclosed value is within ±5% of the exemplary specified value.

As shown in FIG. 1, the housing 100 has a first section 110 with a first plurality of layers 132 each having a first thickness 134. The first thickness 134 extends in a direction perpendicular to the propagation direction P. The housing 100 has at least one second section 120 with a second plurality of layers 136 each having a second thickness 138 in the direction perpendicular to the propagation direction P. In the shown embodiment, the second thickness 138 of each of the second layers 136 of the housing 100 in the second sections 120 is greater than the first thickness 134 of each of the first layers 132 of the housing 100 in the first section 110.

As shown in FIG. 1, each of the base 140, the first receiving portion 142, and the second receiving portion 144 are formed of the plurality of layers 130 of the housing material. The first section 110 with the first plurality of layers 132 forms at least a part of the first receiving portion 142 and the second receiving portion 144 on opposite sides of the channel 146 in the propagation direction P. The second section 120 with the second plurality of layers 136 forms at least a part of the base 140.

Figure 3:
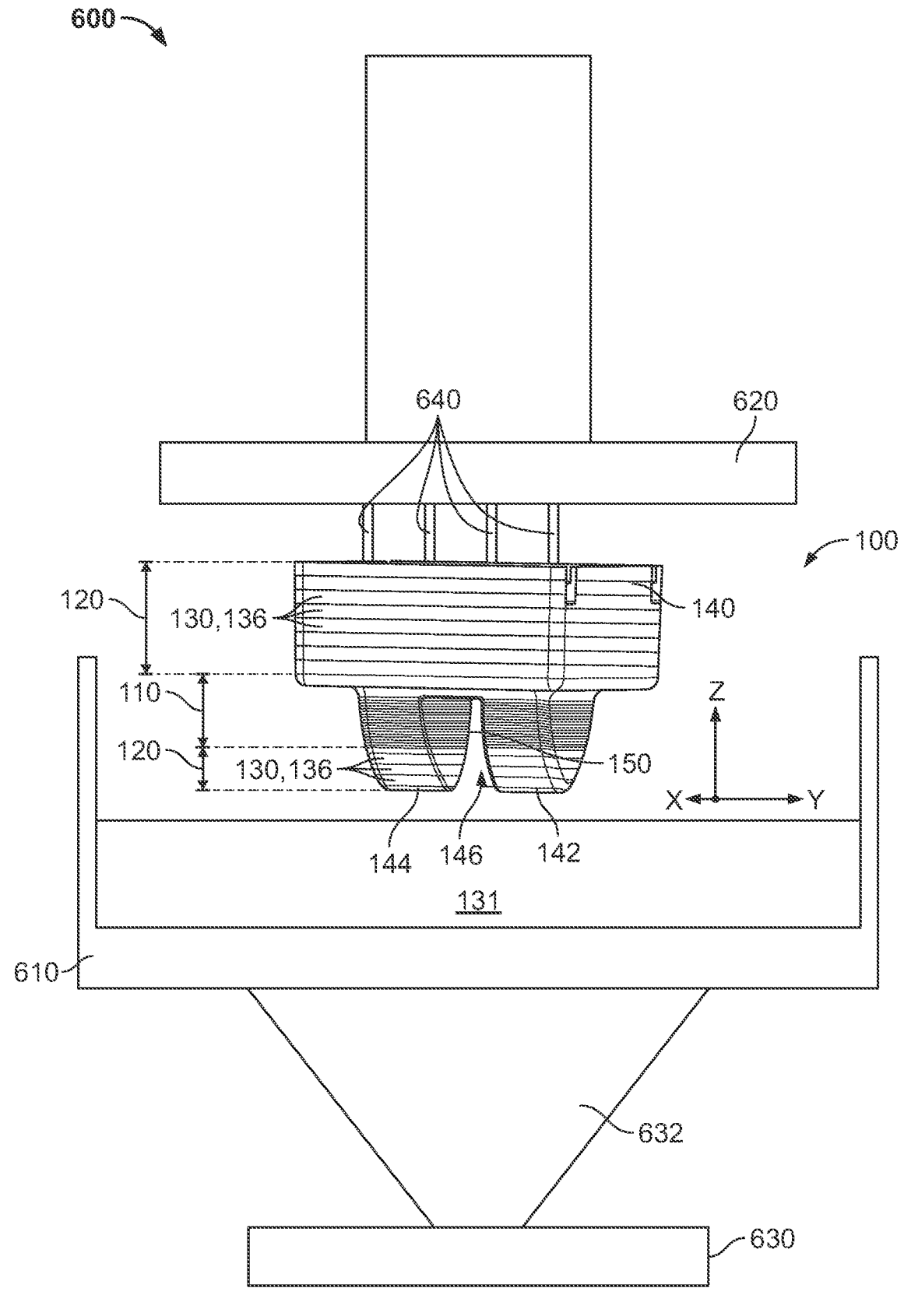
FIG. 3 is a schematic diagram of a printer with a housing of the ultrasonic sensor.

In the embodiment shown in FIGS. 1-3, the housing 100 has a pair of second sections 120; the first section 110 forms a part of each of the first receiving portion 142 and the second receiving portion 144 adjacent to the base 140, one of the second sections 120 forms the base 140, and another of the second sections 120 forms another part of the first receiving portion 142 and the second receiving portion 144 at an end opposite the base 140. In other embodiments, the arrangement of the first section 110 and the number and arrangement of the second sections 120 may differ, provided that the first section 110 forms a part of the first receiving portion 142 and the second receiving portion 144 on both sides of the channel 146. In further embodiments, the housing 100 may have additional sections that contain layers 130 of the housing material having different thicknesses than the first thickness 134 and the second thickness 138 described above.

The layers 130, 132, 136 and thicknesses 134, 138 described above with respect to FIG. 1 are not labeled in FIGS. 2A and 2B for clarity of the drawings, but apply in the same manner in the sections 110, 120 as shown in FIG. 1.

The housing 100, as shown in FIG. 3, is formed of the plurality of layers 130 by a printer 600. The printer 600 produces products by additive manufacturing, and in the shown embodiment is a vat photopolymerization printer. The printer 600 includes a vat 610 that contains a housing material 131 in a liquid state, a plate 610 that is movable into and out of the liquid contained in the vat 610, and a light source 630 that can selectively expose light on various areas of the liquid housing material 131 contained in the vat 610. The housing material 131 may be a photopolymer resin that is curable from the liquid state to a cured state by a light 632 irradiated by the light source 630. The printer 600 may operate by stereolithography (SLA), digital light processing (DLP), continuous digital light processing (CDLP), or any other type of three-dimensional printing process that creates a product by sequentially curing a plurality of layers of a liquid material.

To print the housing 100 using the printer 600, a user selects the first thickness 134 of the first plurality of layers 132, the second thickness 138 of the second plurality of layers 136, an orientation 150 of the housing 100 on the plate 620, and a plurality of supports 640 that connect the housing 100 to the plate 620 in the desired orientation 150 during printing. The orientation 150 of the housing 100 on the plate 620 shown in FIG. 3 and indicated by coordinate axes, in which the layers 130 are parallel to a bottom of the housing 100, is merely exemplary. In other embodiments, the orientation 150 could be any orientation that allows the printer 600 to successfully print the housing 100; in some embodiments, the layers 130 of the housing 100 may be printed with an orientation 150 within 60° of the orientation shown in FIG. 3, and in other embodiments may be printed within 30° of the orientation shown in FIG. 3. Although the housing 100 is shown in FIG. 3 with the base 140 closer to the plate 620, the housing 100 could also be printed inverted from the orientation shown with the receiving portions 142, 144 closer to the plate 620, at any of the orientation 150 angles described above.

The printer 600 prints the housing 100 according to the settings of the first thickness 134, the second thickness 138, the orientation 150, and the supports 640. The printer 600 prints from the top to the bottom of the schematic depiction shown in FIG. 3, first printing the supports 640 attached to the plate 620, then the base 140 of the housing 100, followed by the first receiving portion 142 and the second receiving portion 144 in the successive plurality of layers 130. Each layer 130, at the thickness 134, 138 selected by the user, is printed by exposing the light 632 from the light source 630 on the desired portion of the liquid housing material 131 in the vat 610, curing the housing material 131 in the layer 130 to a solid state, by which the layer 130 is adhered to the previously solidified layer 130. The printer 600 continues in this manner for each of the layers 130 of the housing 100 and adjusts the position of the plate 620 with respect to the vat 610 to control the thickness 134, 138 of each layer 130 to create the first thicknesses 134 of the first plurality of layers 132 in the first section 110 of the housing 100 and to create the second thicknesses 138 of the second plurality of layers 136 in the second sections 120 of the housing 100.

The layers 130 of the housing material 131 are cured and integrally connected together to form the housing 100 described above. As contrasted to other types of printing, such as deposition printing methods, each of the layers 130 of the housing 100 printed by the printer 600 has a consistent and homogeneous density across the layer 130; each layer 130 throughout the printed housing 100 has the equivalent of a 100% infill.

The layers 130, including the first plurality of layers 132 and the second plurality of layers 136, are shown in an exaggerated schematic manner in FIGS. 1 and 3 for clarity of the description with reference to the layers 130. In the actual housing 100, the layers 130, 132, 136 may not be visible on the exterior of the housing 100. The spacing of the layers 130, 132, 136 to indicate the thicknesses 134, 138 in FIGS. 1 and 3 is also schematic and not intended to be a scale representation; the numerical value of the thicknesses 134, 138 should be understood as described herein and not with reference to the particular scale of the drawings.

The emitter 200, as shown in FIGS. 2A and 2B, is disposed within the housing 100 in the first receiving portion 142. The emitter 200 is a piezoelectric crystal that is capable of being electrically excited at its resonant frequency with an input voltage to produce an ultrasonic wave W.

The receiver 300, as shown in FIGS. 2A and 2B, is disposed within the housing 100 in the second receiving portion 144. The receiver 300 is a piezoelectric crystal that receives the ultrasonic wave W from the emitter 200 and produces an output voltage based on the received ultrasonic wave W.

The controller 400 includes a processor 410 and a memory 420 connected to the processor 410, as shown in FIGS. 2A and 2B. The memory 420 is a non-transitory computer readable medium capable of storing program instructions thereon that are executable by the processor 410. The processor 410 executes programs stored on the memory 420 to perform the functions of the controller 400 described herein. The controller 400 has an emitter connection line 430 connecting the controller 400 to the emitter 200 along which the controller 400, by execution of the processor 410, can transmit an input voltage 432 to the emitter 200. The controller 400 has a receiver connection line 440 connecting the controller 400 to the receiver 300 along which the controller 400, by execution of the processor 410, can receive an output voltage 442 from the receiver 300.

The operation of the ultrasonic sensor 10 will now be described in greater detail primarily with reference to FIGS. 2A and 2B. The ultrasonic sensor 10, in the shown embodiment, is used to detect the presence of a bubble B in a fluid F that passes through a fluid conduit 500, such as a flexible tube.

As shown in FIGS. 1, 2A, and 2B, the fluid conduit 500 is positioned in the channel 146, between the first receiving portion 142 and the second receiving portion 144. The fluid conduit 500 is aligned with the first section 110 of the housing 100 in the propagation direction P. The emitter 200 and receiver 300 are aligned with the first section 110 of the first receiving portion 142 and the second receiving portion 144 in the propagation direction P and, likewise, are also aligned with the fluid conduit 500 positioned in the channel 146 in the propagation direction P.

With the fluid conduit 500 positioned in the ultrasonic sensor 10 as shown in FIGS. 2A and 2B, the controller 400 outputs the input voltage 432 to the emitter 200 along the emitter connection line 430. The emitter 200 produces the ultrasonic wave W in accordance with the input voltage 432, which is emitted out from the emitter 200 in the propagation direction P toward the channel 146 and into the fluid F in the fluid conduit 500. The ultrasonic wave W is received by the receiver 300 after it passes through the fluid F, and the receiver 300 outputs the output voltage 442 depending on the ultrasonic wave W along the receiver connection line 440 back to the controller 400.

The ultrasonic wave W received by the receiver 300 is impacted by refraction through the medium of the fluid F and by the presence of bubbles B in the fluid F; the output voltage 442 is representative of the ultrasonic wave W received by the receiver 300. The controller 400 analyzes the output voltage 442 to determine a presence or an absence of a bubble B in the fluid F. A drop in the output voltage 442 indicates that the bubble B is present, as shown in FIG. 2B.

The accuracy of the detection of the bubble B in the fluid F, based on the analysis of the output voltage 442 by the controller 400, depends on a transmission efficiency of the ultrasonic wave W. The transmission efficiency can be calculated by the controller 400 according to the equation:

$$\text{Efficiency} = 20 \log_{10}\left(\frac{V_{in}}{V_{NoBubble}}\right) \qquad \text{(Equation 1)}$$

where $V_{in}$ is the input voltage 432 and $V_{NoBubble}$ is the output voltage 442 independent of an influence of a bubble B the fluid F. The efficiency of the ultrasonic wave W is calculated based on a ratio of the input voltage 432 to the output voltage 442 in the absence of a bubble B; the efficiency represents how much of the ultrasonic wave W emitted by the emitter 200 is received by the receiver 300 through the fluid 310 in the absence of bubbles 312, 314.

A greater efficiency of the ultrasonic wave W leads to more accurate determinations of the presence of the bubble B in the fluid F. The efficiency of the ultrasonic wave W is dictated, at least in part, by the material and structure of the housing 100. The housing 100 supports and propagates the ultrasonic wave W along the propagation direction P; the propagation of the ultrasonic wave W and the efficiency of the ultrasonic wave W is a function of a material density, an elastic modulus, and an attenuation of the housing material of the housing 100.

In the housing 100 described above that is printed by the printer 600, the thickness of the layers 130 of the housing material 131 that form the housing 100 also determine the efficiency of the ultrasonic wave W.

Figure 4:
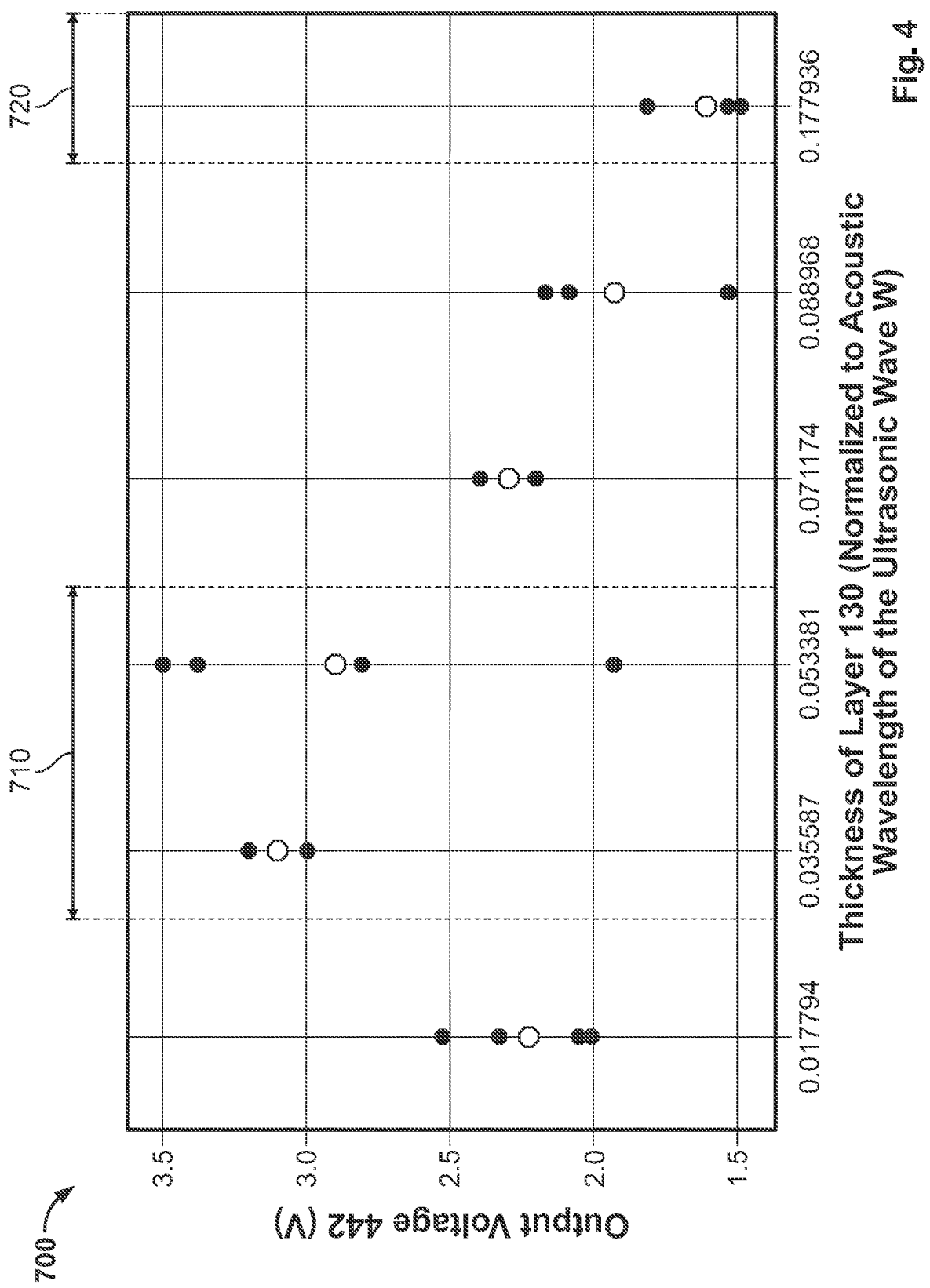
FIG. 4 is a graph of an output voltage of the ultrasonic sensor versus a thickness of a plurality of layers of the housing of the ultrasonic sensor.

FIG. 4 is a graph 700 of experimental data for the ultrasonic wave W propagated along the propagation direction P through the housing 100. The X-axis of the graph is a range of thicknesses of layers 130 of the housing 100 in a portion of the housing 100 that the ultrasonic wave W propagates through. The various thicknesses of the layers 130 on the X-axis are normalized to an acoustic wavelength of the ultrasonic wave W; the scale of the X-axis is a ratio of the thicknesses of the layers 130 to the acoustic wavelength of the ultrasonic wave W. The Y-axis is the output voltage 442 received by the controller 400 from the receiver 300 for a constant input voltage 432 to the emitter 200.

As shown in FIG. 4, the highest output voltage 442 is received, and the efficiency of the ultrasonic wave W propagated through the housing 100 is highest, when a ratio of the thickness of the layers 130 of the housing 100 to the wavelength of the ultrasonic wave W is in a first range 710 of greater than or equal to approximately 0.03 and less than or equal to approximately 0.06. Conversely, the lowest output voltage 442 is received, and the efficiency of the ultrasonic wave W propagated through the housing 100 is lowest, when the ratio of the thickness of the layers 130 of the housing 100 to the wavelength of the ultrasonic wave W is in a second range 720 greater than or equal to approximately 0.15.

When printing the housing 100 using the printer 600, the first thickness 134 of the first plurality of layers 132 in the first section 110 and the second thickness 138 of the second plurality of layers 136 in the second sections 120 are selected based on the desired efficiency of the ultrasonic wave W propagating through the housing 100.

The emitter 200 and the receiver 300 are aligned with the first section 110 in the propagating direction P. In the first section 110, the first thickness 134 of the first plurality of layers 134 is selected to maximize the efficiency of the ultrasonic wave W. According to the data shown in the embodiment of FIG. 4, a ratio of the first thickness 134 of the first plurality of layers 132 of the housing 100 to the wavelength of the ultrasonic wave W is in the first range 710 of greater than or equal to approximately 0.03 and less than or equal to approximately 0.06.

The second thickness 138 of the second plurality of layers 136 in the second sections 120 can be selected to minimize the efficiency of any stray portion of the ultrasonic wave W that enters the second sections 120. According to the data shown in FIG. 4, a ratio of the second thickness 138 of the second plurality of layers 136 of the housing 100 to the wavelength of the ultrasonic wave W is in the second range 720 of greater than or equal to approximately 0.15.

The orientation 150 of the housing 100 when printed on the printer 600, as shown in FIG. 3, can also be selected based on the desired transmission efficiency of the ultrasonic wave W through the housing 100. As the layers 130 of the housing 100 are printed by the printer 600 parallel to the plate 620, the selection of the orientation 150 influences the positioning of the layers 130 in the housing 100 and, particularly, the positioning of the first section 110 with the layers 132 having the first thickness 134 with respect to the emitter 200, the receiver 300, and the propagation of the ultrasonic wave W.

In the ultrasonic sensor 10, with the housing 100 selected and printed to have the first section 110 with the first plurality of layers 132 each having the first thickness 134 and the second sections 120 with the second plurality of layers 136 each having the second thickness 138 greater than the first thickness 134, the ultrasonic wave W transmitted through the housing 100 has a greater transmission efficiency in the first section 110 than in the second sections 120. Maximizing the efficiency in the first section 110 by selecting the first thickness 134 of the layers 132 maximizes the efficiency of the ultrasonic wave W received by the receiver 300 and the accuracy of the analysis of the bubbles B in the fluid F performed by the controller 400. Selecting the second thickness 138 greater than the first thickness 134 for the second sections 120 dampens the effect of the any unwanted ultrasonic propagation and minimizes ringing, which further improves the accuracy of the controller 400 analysis. The housing 100 of the ultrasonic sensor 10 disclosed herein thus allows for a faster, less expensive, and easier manufacturing process with fewer parts, at low volumes of housing 100 production, that maintains high ultrasonic wave W efficiency and accuracy of sensor 10 detection.

What is claimed is:

1. A housing of an ultrasonic sensor, comprising:

a plurality of layers of a housing material integrally connected together to form the housing, a first section of the housing has a first plurality of layers of the housing material each with a first thickness, a second section of the housing has a second plurality of layers of the housing material each with a second thickness, the second thickness is greater than the first thickness and an ultrasonic wave transmitted through the housing has a greater transmission efficiency in the first section than in the second section.

2. The housing of claim 1, wherein a ratio of the first thickness to a wavelength of the ultrasonic wave is greater than or equal to approximately 0.03 and less than or equal to approximately 0.06.

3. The housing of claim 2, wherein a ratio of the second thickness to the wavelength of the ultrasonic wave is greater than approximately 0.15.

4. The housing of claim 1, further comprising a base, a first receiving portion extending from the base, and a second receiving portion extending from the base, each of the base, the first receiving portion and the second receiving portion are formed of the plurality of layers.

5. The housing of claim 4, wherein the housing has a channel defined between the first receiving portion and the second receiving portion.

6. The housing of claim 5, wherein the first section with the first plurality of layers forms at least a part of the first receiving portion and the second receiving portion on opposite sides of the channel.

7. The housing of claim 6, wherein the second section with the second plurality of layers forms at least a part of the base.

8. The housing of claim 6, wherein the second section with the second plurality of layers forms another part of the first receiving portion and/or the second receiving portion.

9. The housing of claim 1, wherein the housing material is a photopolymer resin that is curable by light irradiation.

10. The housing of claim 1, wherein each of the layers of the housing material has a consistent and homogeneous density across the layer.

11. The housing of claim 1, wherein the layers of the housing material are parallel to a propagation direction of the ultrasonic wave.

12. An ultrasonic sensor, comprising:

a housing including a plurality of layers of a housing material integrally connected together, a first section of the housing has a first plurality of layers of the housing material each with a first thickness, a second section of the housing has a second plurality of layers of the housing material each with a second thickness, the second thickness is greater than the first thickness and an ultrasonic wave transmitted through the housing has a greater transmission efficiency in the first section than in the second section.

13. The ultrasonic sensor of claim 12, further comprising an emitter and a receiver disposed in the housing, the emitter emits the ultrasonic wave into the housing and the receiver receives the ultrasonic wave through the housing.

14. The ultrasonic sensor of claim 13, wherein the receiver outputs an output voltage proportional to the ultrasonic wave received at the receiver, the output voltage is higher for the ultrasonic wave received through the first section than for the ultrasonic wave received through the second section.

15. A process for manufacturing a housing of an ultrasonic sensor, comprising:

printing the housing with a printer as a plurality of layers of a housing material integrally connected together, the printer prints a first section of the housing with a first plurality of layers of the housing material each having a first thickness, and prints a second section of the housing with a second plurality of layers of the housing material each having a second thickness, the second thickness is greater than the first thickness, the first thickness is selected to have a greater transmission efficiency than the second thickness for transmitting an ultrasonic wave through the housing.

16. The process of claim 15, wherein the printer has a vat containing the housing material in a liquid state, a plate movable with respect to the vat, and a light source curing the housing material from the liquid state to a cured state.

17. The process of claim 15, further comprising selecting an orientation of printing the housing based on the transmission efficiency of the ultrasonic wave through the housing.

18. The process of claim 15, wherein the first thickness is selected to maximize the transmission efficiency of the ultrasonic wave through the first section of the housing.

19. The process of claim 18, wherein the second thickness is selected to minimize the transmission efficiency of the ultrasonic wave through the second section of the housing.

20. The process of claim 15, wherein each of the layers printed by the printer has a consistent and homogeneous density across the layer.

* * * * *